Patented May 10, 1932

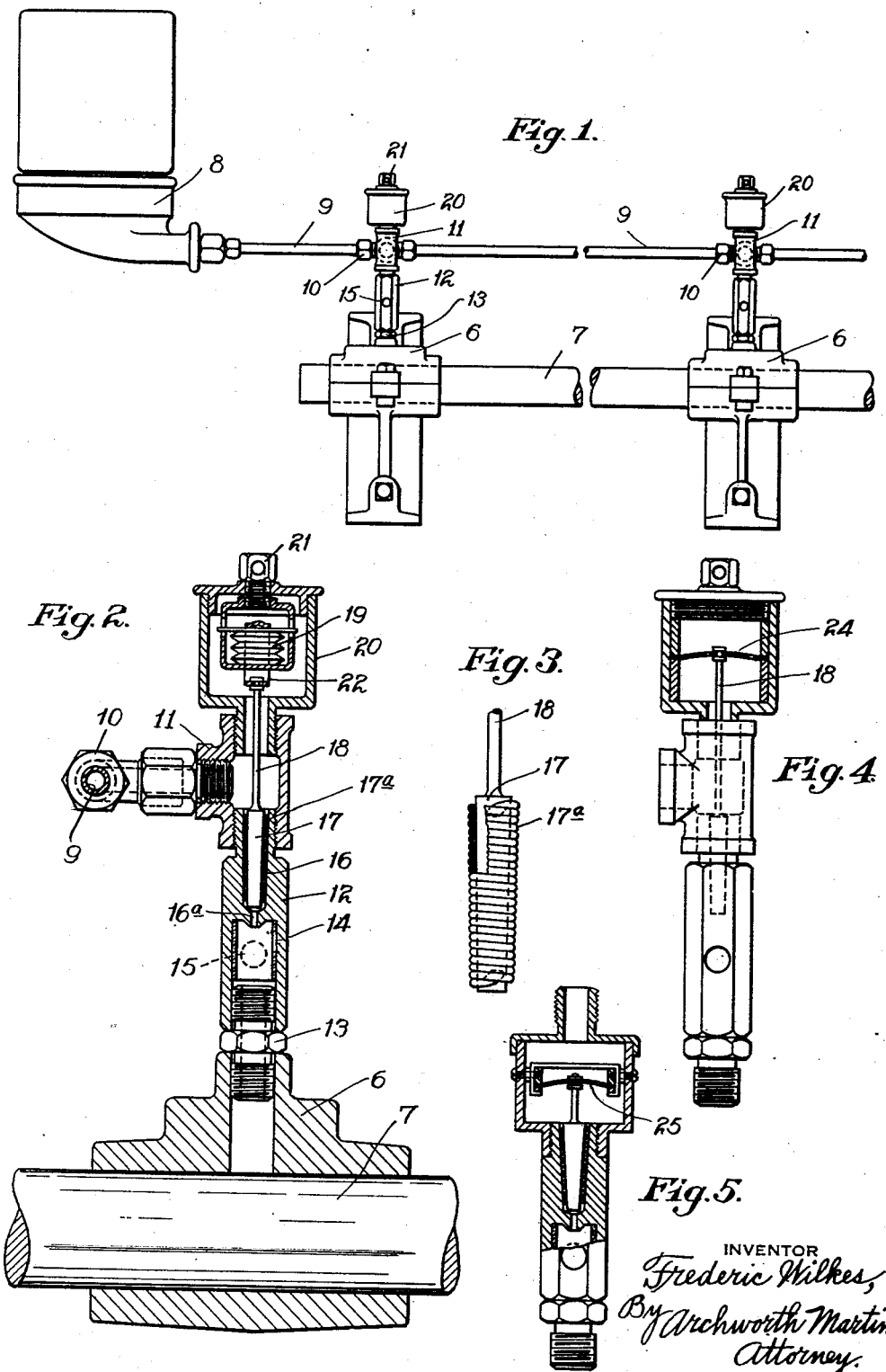

1,857,992

UNITED STATES PATENT OFFICE

FREDERIC WILKES, OF WILKINSBURG, PENNSYLVANIA

LUBRICATING APPARATUS

Application filed December 22, 1930. Serial No. 503,889.

My invention relates to lubricating apparatus, and more particularly to apparatus that is suitable for lubricating shaft bearings.

One object of my invention is to provide means for supplying lubricant to shaft bearings at a rate of flow which varies in accordance with changes in temperature.

Another object of my invention is to provide a lubricating apparatus of the slow feed type such as drop-by-drop, and a flow-control valve of such form that the flow of oil will not be materially affected through changes in temperature of the metal parts of the valve, which changes tend to increase or decrease the clearance space through which the lubricant flows past the valve.

Still another object of my invention is to simplify and improve generally lubricating apparatus for shaft bearings and the like.

Some of the forms which my invention may take are shown in the accompanying drawings, wherein Figure 1 is a side elevational view of an installation embodying my invention; Fig. 2 is a sectional view, on an enlarged scale, of a portion of the apparatus of Fig. 1, with certain of the parts turned at right angles to the position shown in Fig. 1; Fig. 3 is a view, on a still further enlarged scale, of the valve or flow controlling device of Fig. 2; Fig. 4 shows a modification of the structure of Fig. 2, and Fig. 5 shows still another modification thereof.

The apparatus may conveniently be installed in such manner that a plurality of bearings will be lubricated from a common source of lubricant supply, thus avoiding the necessity of providing an oil cup at each bearing, with consequent saving in material and labor, since the attendant need only maintain a sufficient quantity of lubricant in the reservoir or other source of supply, instead of attending to each bearing individually.

While I have shown the apparatus as employed in connection with only two bearings, it will be understood that it may be applied to any number of bearings and such bearings need not be necessarily located in a given plane, but may be distributed over various parts of a machine and even extend to a plurality of machines, since flow of lubricant at each bearing is automatically controlled at such bearing.

The apparatus is shown as applied to the bearings 6 of a shaft 7, which bearings may be of somewhat the usual form, but having my lubricating apparatus applied thereto instead of the oil cups such as ordinarily employed.

The source of oil supply may be a chamber 8 of any suitable form, such, for example, as that shown in my Patent No. 1,579,586 of April 6, 1926. A supply line 9 leads from the reservoir 8 and it is to this supply line that the apparatus embodying my invention is connected, by means of couplings 10 and 11.

A sight feed chamber 12 that serves also as a conduit is mounted on the bearing 6, by means of a nipple-like coupling member 13, so that oil may flow to the bearing 6 from the chamber 12. The chamber 12 contains a glass tube or sleeve 14 snugly fitted therein and has a hole 15 drilled through one side thereof so that an operator can see whether drops of oil are falling through the chamber 12 to the bearing.

The chambered block 12 in its upper portion has a passageway 16 that is slightly tapered and whose walls serve as a seat for a valve 17, the passage 16 having communication through a small orifice 16a with the chamber at the mid portion of the block 12.

An important feature of my invention resides in the construction of the valve 17, whose body portion may be of any suitable metal, and which is wound or otherwise covered with fibrous material 17a that may be in the form of cotton cord, cloth or the like. The valve 17 has a stem 18 by means of which it may be manually adjusted to various vertical positions on its seat 16 or by means of which it may be connected to an automatic controlling device to be hereinafter explained.

Oil will, of course, seep past the cord or fibrous body 17a at a rate dependent upon the closeness of fit between the valve and its seat 16. In case no automatic controlling device is employed, the valve will be manually positioned at such vertical point as to cause drops of oil to fall to the bearing 6 with the desired frequency. The yieldability of the covering 17a will cause the valve to remain in the position to which it has been set. If the valve is pressed rather snugly to its seat, the oil will seep past it very slowly, whereas for faster oil feed, the valve will be raised somewhat to provide greater clearance for flow of the oil.

When the metal of the block 12 tends to contract around the valve through lowering of atmospheric or internal temperatures, the fibrous covering 17a will, of course, yield to permit slight compression thereof by the contraction of the metal, but oil can still flow past the valve, whereas if the valve did not have a fibrous covering, the clearance space between it and its seat might be so reduced as to seriously affect the flow of lubricant. Upon expansion of the metal of the block 12, the fibrous covering will, by reason of its elasticity, also expand, and thereby tend to prevent excessive flow of oil past the valve.

In order to effect automatic actuation of the valve through temperature changes, as when the bearing 6 becomes heated and requires additional lubricant, I provide a thermostat 19 which is mounted in a chamber 20 that has an orifice 21 in its upper end. The chamber and the orifice serve as a breathing passage for the oil line 9, to permit entry of air to the reservoir 8 when the oil level in the line 9 falls below a predetermined point. The supply in the oil line 9 is thus automatically controlled as set forth in my patent above referred to.

The sylphon 19 may contain a volatile fluid that will expand upon increase in temperatures, as is common in devices of this character. The valve stem 18 is connected to the upper side of the sylphon by means of a yoke 22, so that when the bellows or sylphon 19 expands, the valve 17 will be raised slightly to permit increased flow of oil to the bearing 6. This expansion may occur under the influence of heat from the bearing when the bearing becomes over-heated, and therefore requires additional lubricant. When the bearing is cooled, the sylphon 19 will be contracted, and the valve 17 forced closer to its seat to thereby reduce the flow of lubricant.

Referring now to Fig. 4, I show a structure similar to that of Fig. 2, but wherein a metal disc 24 is substituted for the bellows 19. This disc 24 is normally dished upwardly somewhat, so that when it expands under increases in temperature, the mid portion thereof will bulge upward a slight distance, thus lifting the valve stem 18, whereas upon contraction, the mid portion of the disc will move downwardly to move the valve closer to its seat. The disc 24 will preferably be made of a metal that has greater expansion and contraction through temperature changes than do the other metal parts of the apparatus. A bi-metal disc may be employed for the disc 24, if desired.

In Fig. 5, I show a structure wherein an expansible element 25 for actuating the valve is positioned adjacent to the shaft bearing so that changes in temperature of the bearing will be more readily and quickly transmitted to the expansible element, thereby causing actuation of the valve before the bearing becomes excessively heated.

As shown in Figs. 2 and 5, the lower end of the valve 17 when in its lowermost position will engage the upper wall of the orifice 16a. Downward movement of the valve is therefore limited so that the compressible covering 16 cannot be compacted to an excessive degree.

I claim as my invention:—

1. Lubricating apparatus comprising a vertically-extending conduit having a portion of its wall of elongated form and tapering toward one end thereof, and a valve comprising a body portion of elongated form, and covered with cord-like fibrous material spirally wound on the body portion, the said valve cooperating with the tapering wall of the conduit to control flow of lubricant.

2. Lubricating apparatus comprising a vertically-extending conduit having a portion of its wall of elongated form and tapering toward one end thereof, and a valve comprising a body portion of elongated form, and covered with cord-like fibrous material spirally wound in the body portion, each successive turn of the spirally-wound fibrous material being arranged closely adjacent to the preceeding turn, thereby to permit restricted flow of lubricant between the fibrous material and the said tapered wall portion, the said valve cooperating with the tapering wall of the conduit to control flow of lubricant.

3. Lubricating apparatus comprising a valve body having a vertically-extending tapered passageway of elongated form therein, means for directing lubricant to the upper end of said passageway, a movable member of elongated form positioned in said passageway, and a cord-like fibrous material spirally wound on a portion of the length of said member and movable therewith, said member and its fibrous material constituting a valve device cooperating with the said passageway to control flow of lubricant therethrough and normally positioned to permit a restricted flow of lubricant.

4. Lubricating apparatus comprising a valve body having a vertically-extending tapered passageway of elongated form therein, means for directing lubricant to the upper end of said passageway, a movable member of elongated form positioned in said passageway, and a cord-like fibrous material spirally wound on a portion of the length of said member and movable therewith, said member and its fibrous material constituting a valve device cooperating with the said passageway to control flow of lubricant therethrough and normally positioned to permit a restricted flow of lubricant, the said winding of fibrous material and the portion of the said member on which the winding is positioned being tapered complementary to the tapering of said passageway.

5. Lubricating apparatus comprising a vertically-extending conduit having a portion of its wall of elongated form and tapering toward one end thereof, means for directing lubricant to the upper end of the tapered wall portion, a valve having a body portion of elongated form positioned in said conduit adjacent to the tapered wall thereof, a covering of loosely woven fibrous material wrapped around the body portion of said valve and secured thereto, means for moving said valve longitudinally of said tapered wall portion for controlling the rate of flow of lubricant therethrough, and means for limiting movement of said valve toward the smaller end of the tapered wall portion, thereby to permit a restricted flow of lubricant between the valve and said wall.

6. Lubricating apparatus comprising a vertically-extending conduit having a portion of its wall of elongated form and tapering toward one end thereof, means for directing lubricant to the upper end of the tapered wall portion, a valve having a body portion of elongated form positioned in said conduit adjacent to the tapered wall thereof, a covering of loosely woven fibrous material wrapped around the body portion of said valve and secured thereto, a thermostat device connected to said valve and responsive to changes in temperatures in said conduit for moving said valve and fibrous material longitudinally of said passageway, thereby to control the rate of flow of lubricant therethrough, and stop means for limiting movement of said valve toward the smaller end of the tapered wall portion thereby to permit restricted flow of lubricant between the valve and said wall.

In testimony whereof I, the said FREDERIC WILKES, have hereunto set my hand.

FREDERIC WILKES.